3,342,840
CATIONIC ESTER PRODUCTION
Igor Sobolev, Orinda, Calif., assignor to Shell Oil Company, New York, N.Y., a corporation of Delaware
No Drawing. Filed Mar. 23, 1964, Ser. No. 354,089
6 Claims. (Cl. 260—404)

ABSTRACT OF THE DISCLOSURE

Cationic esters useful as surface-active agents are produced by reaction of an aqueous glycidyltrialkylammonium halide and a fatty acid of up to 4 carboxyl groups.

This invention relates to a novel method for the production of certain cationic esters, and to the novel class of compounds produced thereby. More particularly it relates to a certain class of novel esters containing quaternary ammonium moieties.

Compounds incorporating quaternary nitrogen atoms and ester linkages within the molecule are known in the art, being produced, for example, by acylation of ethanolamine derivatives. Such materials have utility as surface active agents and the like, particularly when the acid moiety of the cationic ester is long chain alkyl. In part because of the method of production, it is difficult to prepare esters of this type with additional reactive functional groups, and similar esters of the prior art customarily contain only the ester linkage and the quaternary ammonium moiety as active sites. It would be of advantage to provide a class of cationic esters with additional reactive functional groups, whereby the esters could be employed to modify the properties of other materials by reaction therewith, or alternatively provide for modification of the properties of the ester.

It is an object of the present invention to provide a novel process for the production of certain esters conaining quaternary ammonium groups, and the novel class of products produced thereby. A further object is the provision of such cationic esters incorporating additional reactive functional groups within the molecule. A particular object is the provision of the class of novel esters which comprises higher aliphatic acid esters of the 3-hydroxy substituent of a 2,3-dihydroxypropyltrialkylammonium halide, and a novel method for the production thereof.

It has now been found that these objects are accomplished by reacting higher aliphatic acids with an aqueous solution of glycidyltrialkylammonium halide. Surprisingly, the esterification process proceeds smoothly in the absence of catalyst to produce useful cationic esters in high yield and purity with little or no formation of expected by-products, e.g., the glycol which would be expected to be formed by hydrolysis of the glycidyltrialkylammonium halide under the conditions of the reaction.

The glycidyltrialkylammonium halide employed as a reactant in the process of the invention comprises a quaternary nitrogen atom to which are attached three alkyl radicals and a glycidyl, i.e., 2,3-epoxypropyl, radical. The nitrogen, being tetravalent, is positively charged, and in the reactants of the invention is associated by means of an ionic bond with a negatively charged halide ion. Suitable glycidyltrialkylammonium halides contain halogen having an atomic number from 17 to 35, that is, the middle halogens chlorine and bromine, and alkyl groups which independently have from 1 to 12 carbon atoms. Such materials are represented by the formula

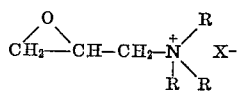

wherein X is middle halogen and R is alkyl having from 1 to 12 carbon atoms. Preferred are glycidyltrialkylammonium halides of the above-depicted formula wherein at least two, more preferably three, of the alkyls are lower alkyl, that is, contain from 1 to 4 carbon atoms. Illustrative of such compounds are glycidyltrimethylammonium chloride, glycidyltriethylammonium bromide, glycidyldimethylhexylammonium chloride, glycidyldipropyldecylammonium bromide, glycidyldimethyllaurylammonium chloride, glycidyldiethylpropylammonium chloride, glycidylmethylethylamylammonium bromide, glycidyltributylammonium chloride, and glycidyltrimethylammonium bromide. In general, quaternary ammonium chlorides are preferred over the corresponding bromides, and most preferred as the quaternary ammonium halide reactant is glycidyltrimethylammonium chloride.

The quaternary ammonium halides are conveniently prepared by reaction of the appropriate trialklyamine and α-halo epoxyalkyl compounds in aprotic reaction diluent. For example, from trimethylamine and epichlorohydrin is prepared glycidyltrimethylammonium chloride.

The glycidyltrialkylammonium halides are preferably employed in aqueous solution. Although other solvents that are miscible with water may be present, in the preferred modification of the process of the invention, the quaternary ammonium halide is employed in a solution where water is substantially the only solvent present. The concentration of glycidyltrialkylammonium halide is not critical, however, and concentrations from about 20% to about 90% by weight glycidyltrialkylammonium halide are satisfactorily utilized. Preferred, however, are concentrations from about 50% to about 80% by weight.

In the process of the invention, the aqueous glycidyltrialkylammonium halide is reacted with a higher aliphatic acid, preferably with a fatty acid. By the term fatty acid as employed herein is meant a mono- to polycarboxylic acid which contains a relatively high number of carbon atoms for each carboxy group present. The fatty acid is saturated or contains one or more ethylenic linkages, i.e., non-aromatic carbon-carbon double bonds, but is preferably free from acetylenic unsaturation. The fatty acid is acyclic or may contain carbocyclic moieties, but preferably is wholly aliphatic in character. Preferred fatty acids are hydrocarbon acids, that is, those that contain only atoms of carbon and hydrogen besides the oxygen atoms of the carboxy group(s), and contain from 1 to 4 carboxy groups with from 0 to 4 ethylenic linkages and at least 9 carbon atoms but no more than 30 carbon atoms for each carboxy group present in the acid molecule. From considerations of solubility and rate of reaction, it is desirable that the fatty acid contain no more than 70, preferably no more than 60, carbon atoms.

One class of suitable fatty acids comprises the monocarboxylic fatty acids, both saturated and ethylenically unsaturated, as illustrated by pelargonic acid, capric acid, palmitic acid, lauric acid, tridecyclic acid, myristic acid, stearic acid, arachidic acid, eicosanoic acid, cerotic acid, undecylenic acid, oleic acid, elaidic acid, brassidic acid, geranic acid, linoleic acid, linolenic acid, dehydrogeranic acid and arachidonic acid. Also useful monocarboxylic fatty acids are those acids which are frequently characterized as Koch acids. These carboxylic acids contain at least two and preferably three alkyl substituents upon the carbon atom alpha to the carboxyl group. Such acids are customarily produced by carboxylation of cracked hydrocarbons subsequent to partial hydrogenation, and are typically obtained as a mixture of acids in the $C_9$ to $C_{19}$ range.

Illustrative of polycarboxylic fatty acids are eicosadioic acid, 8,12-eicosadiendioic acid, 3,16-dimethyl-8,12-eicosadiendioic acid, 7,11-octadecadiendioic acid, 3,17-dibutyl-8,13-docosadiendioic acid, dimethyl-7-vinyl-9-hexacadioic acid, dimethyl-8-isopropenyl-10-octadecendioic acid and the like. An especially suitable class of polycarboxylic fatty acids comprises the class known as dimer acids. Such acids are generally mixtures of dimers and/or trimers of unsaturated monocarboxylic fatty acids such as linoleic acid, oleic acid, linolenic acid, ricinoleic acid and the like, and codimers or cotrimers thereof with similar acids. The dimer and trimer acids are prepared by polymerization of the appropriate monomer(s) at midmolecule and are marketed commercially as a mixture of dimerized acid (dicarboxylic acids), trimerized acid (tricarboxylic acids) and a small amount of residual monocarboxylic acid. Although the precise structure of the dimer and trimer acids is not known, it is considered likely that the link between molecules is variable, ranging from simple carbon-carbon bonds to cyclic systems of considerable complexity. It is known, however, that the carboxy groups are not affected by the polymerization, so that the carbon atom-to-carboxy group ratio of the original monomers is not affected.

Preferred fatty acids are mono- to tricarboxylic fatty acids containing from 0 to 3 ethylenic linkages and from 9 to 20 carbon atoms for each carboxyl group present in the molecule. It should be understood that the process of the invention is not limited to the use of single fatty acids, as mixtures of fatty acids such as are encountered in tall oil fatty acid fractions or in commercial dimer acid mixtures are also suitable.

The process of the invention is conducted in liquid-phase solution. As the glycidyltrialkylammonium halide is employed in aqueous solution, the reaction mixture will also be aqueous. In many cases, the reaction may be efficiently conducted in the substantial absence of other solvent, although to increase the solubility of the fatty acid and thus the rate of reaction, co-solvents may be employed. Suitable co-solvents are inert towards the reactants under the conditions of the reaction and are miscible with the water present. Illustrative of such co-solvents are the alcohols, particularly lower monohydric and polyhydric alkanols such as methanol, ethanol, isopropanol, tert-butanol, glycerol and ethylene glycol; the ether-alcohols such as the cellosolves and the carbitols; certain ethers such as tetrahydrofuran and 1,4-dioxane; sulfur compounds such as dimethyl sulfoxide and sulfolane; and amides such as dimethylformamide.

The process of the invention comprises mixing the aqueous glycidyltrialkylammonium halide and fatty acid reactants and co-solvent, if co-solvent is employed, and maintaining the mixture at a somewhat elevated temperature until reaction is complete. The reaction is conducted at pressures which are atmospheric or superatmospheric, so long as the reaction mixture is maintained in the liquid phase. The optimum reaction temperature will in part depend upon the pressure employed, as higher reaction temperatures may be employed when the reaction pressure is greater than atmospheric. Suitable reaction temperatures are from about 40° C. to about 140° C., although when atmospheric pressure is utilized, which pressure is preferred, reaction temperatures from about 40° C. to about 105° C. are satisfactorily utilized while reaction temperatures from about 45° C. to about 95° C. are preferred. The method of mixing is not material. One reactant may be added to the other in increments, although it is equivalently useful and frequently preferred to initially mix the entire amount of reactants. The optimum ratio of reactants to be employed will in part depend upon the functionality of the fatty acid reactant, that is, the number of carboxy groups within the molecule. Although ratios of moles of carboxy group to moles of glycidyltrialkylammonium halide from about 1:4 to about 4:1 are suitably employed, molar ratios from about 1:2 to about 2:1 are preferred and it is frequently advantageous to employ ratios that are substantially stoichiometric, that is, a ratio of moles of carboxy group to moles of glycidyltrialkylammonium halide that is substantially 1:1.

It is frequently desirable to make some provision in the reaction procedure for the inhibition of fatty acid polymerization when the fatty acid employed is ethylenically unsaturated. Surprisingly, it is not necessary to rigorously exclude oxygen from the reaction environment, and the process of the invention is conveniently conducted under an atmosphere of air. Prevention of unsaturated fatty acid polymerization is customarily accomplished by the inclusion within the reaction mixture of an inhibitor. Conventional polymerization inhibitors capable of trapping organic free radicals formed during the reaction process are satisfactory, provided that the inhibitor is inert toward the glycidyltrialkylammonium halide reactant or products produced therefrom. Preferred inhibitors therefore contain no active hydrogen atoms. Illustrative of suitable inhibitors are the quinones, particularly mono- to dicyclic quinones, e.g., 1,4-benzoquinone, 1,2-benzoquinone and 1,4-naphthoquinone and alkylated or halogenated, particularly chlorinated, derivatives thereof such as chloranil, duroquinone, 2-ethylbenzoquinone and the like; as well as hindered phenols, i.e., phenols wherein the phenolic hydroxyl group is hindered by the presence of branched alkyl substituents on each ring position ortho relative to the hydroxyl group. Illustrative of the class of hindered phenolic inhibitors are 2,6-di-tert-butylphenol, 2,6-di-tert-butyl-4-methylphenol, 2,6-diisopropylphenol, 2,4,6-tri-tert-butylphenol and the like. The inhibitor, if employed, is added in comparably small amounts. Amounts of inhibitor from about 0.001 to about 0.1 mole percent, based upon the unsaturated acid reactant are suitable, while amounts from about 0.01% mole to about 0.05% mole on the same basis are preferred.

Subsequent to the conclusion of reaction, the solvent is removed if desired, as by distillation for example, and the product ester is obtained as a solid which is suitable for use in many applications, or may be purified by conventional methods such as recrystallization.

The products of the invention are esters of the fatty acid produced by the reaction of the carboxy group(s) thereof with the epoxy, i.e., oxirane, linkage of the glycidyltrialkylammonium halide. The products are therefore mono- to poly-(2 - hydroxy - 3 - dialkylaminopropyl alkohalide) esters of the fatty acid, which terminology is employed to indicate esters of mono- to poly-carboxylic fatty acids and the 3-hydroxyl group of 2,3-dihydroxypropyltrialkylammonium halide, i.e., fatty acid esters in which each alcohol moiety is represented by

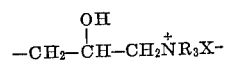

wherein R and X have the previously stated significance. The reaction is illustrated by the following equation:

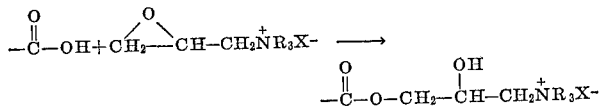

wherein R and X have the previously stated significance.
The products of the process of the invention are therefore generically illustrated by the formula

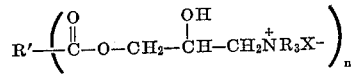

wherein R and X have the previously stated significance, $n$ represents the number of carboxy groups present in the fatty acid reactant, i.e., $n$ is preferably a whole number from 1 to 3 inclusive, and R′ represents the hydrocarbon aliphatic residue of the fatty acid when the carboxy groups are excluded from consideration. R′ therefore preferably contains from 0 to $3n$ ethylenic linkages and from (8 to 19)n carbon atoms. Typical products produced from monocarboxylic fatty acids include 2-hydroxy-3-lauryloxypropyltrimethylammonium chloride, 2 - hydroxy - 3 - tridecanoyloxypropyltrimethylammonium bromide, 2 - hydroxy - 3 - palmityloxypropyltriethylammonium chloride, 2-hydroxy - 3 - stearyloxypropyltripropylammonium chloride, 2 - hydroxy - 3 - oleyloxypropyldimethylhexylammonium bromide, 2 - hydroxy-3-linoleyloxypropyltrimethylamonium bromide, 2-hydroxy-3-eicosanoyloxypropyltributylammonium chloride and the like; while illustrative esters of polycarboxylic acids include di(2-hydroxy - 3 - dimethylaminopropyl) 7,11-octadecadiendioate di(methochloride), di(2 - hydroxy - 3 - diethylaminopropyl) 3,16 - dimethyl - 8,12 - eicosadiendioate di(ethobromide), the [di(2-hydroxy-3-dibutylaminopropyl di(methochloride)] ester of dimerized linoleic acid, and di(2 - hydroxy - 3 - dimethylaminopropyl) 8,12-eicosadiendioate di(methochloride).

The products of the invention are suitable for use in numerous applications. The number and variety of reactive functional groups present allows a wide usage as chemical intermediates, wherein, for example, the hydroxyl group may be esterified or etherified, other useful quaternary ammonium salts may be prepared as by anion exchange, and certain of the fatty acid esters which contain ethylenic unsaturation may be epoxidized to form useful epoxy resin precursors. In addition, the esters are useful as biocidal chemicals, particularly as germicides. The esters are also extremely useful as surface-active agents, showing surface-activity greater than many analogous commercially employed surfactants. In this regard, the esters are especially suitable as emulsifiers, textile and paper softeners, antistatic additives and the like.

To further illustrate the novel process of the invention and the novel cationic ester products produced thereby, the following examples are provided. It should be understood that they are not to be regarded as limitations, as the teachings thereof may be varied as will be understood by one skilled in this art.

Example I

A mixture of 142.2 g. (0.5 mole) of stearic acid and 100 ml. of ispropyl alcohol was heated to 70° C. and 104 g. of 72.5% by weight aqueous glycidyltrimethylammonium chloride solution (0.5 mole) containing 6% of an inert impurity was added. The resulting solution was heated at 80–90° C. for 14 hours in an open vessel. During this time, most of the isopropyl alcohol was lost by evaporation. The product mixture (77% solids) was heated to dryness at 60–70° C. at 25 mm.

Analysis of the solid product showed that the overall yield of 2-hydroxy-3-stearyloxypropyltrimethylammonium chloride was 94.3%. The product purity was 92.7%, due in part to the inert impurity in the quaternary ammonium halide reactant.

Paper chromatography showed the absence of glycol, thus evidencing the lack of hydrolysis of the epoxide reactant or the ester product during reaction.

The cationic ester product was found to be an effective emulsifier for styrene and other hydrocarbons in water; the emulsions formed showed good stability.

Similar results are obtained when glycidyltrimethylammonium bromide is employed as the quaternary ammonium halide reactant.

Example II

A mixture of 128.2 g. of palmitic acid (0.5 mole), 50 ml. of isopropyl alcohol and 104 g. of a 72.5% by weight aqueous glycidyltrimethylammonium chloride solution (0.5 mole) was heated at 75° C. for 19 hours at atmospheric pressure. The solvent was then removed by evaporation at 60–70° C. for three hours at about 25 mm. pressure.

Analysis of the solid product, 2-hydroxy-3-palmityloxypropyltrimethylammonium chloride, indicated a purity, i.e., ester content, of 94.6%. The overall yield, based upon starting materials, was 97.4%.

Similar results are obtained when glycidyltriethylammonium bromide is employed as the quaternary ammonium halide reactant.

Example III

A fatty acid tall oil fraction containing oleic acid and linoleic acid as major components (Hercules Powder Co., PAMAK W4A) with an average molecular weight for the acids present of 294 was esterified by a procedure similar to that of Example I. A mixture of 200 g. (0.68 mole) of the fatty acid mixture, 0.1 g. of 2,6-di-tert-butyl-4-methylphenol inhibitor, 100 ml. of isopropyl alcohol and 148 g. of a 69.5% aqueous solution of glycidyltrimethylammonium chloride (0.68 mole) was heated at 90° C. for 12 hours and then at 50° C. for 18 hours. Analysis indicated the reaction was 97% complete, and the solvent was removed by evaporation at about 60° C. and about 25 mm. pressure.

Analysis of the semi-solid product, which contained 2-hydroxy - 3 - oleyloxypropyltrimethylammonium chloride and 2 - hydroxy-3-linoleyloxypropyltrimethylammonium chloride as major components, indicated an ester purity of 95%. The overall yield of ester, based on reactants charged, was 97%.

Example IV

A mixture of 283 g. of dimer acid (Empol 1014, Emery Industries, Inc.) (0.5 mole), 211 g. of 70% aqueous glycidyltrimethylammonium chloride (1 mole) and 100 ml. of isopropanol was heated for 8 hours at 50° C. and for 8 additional hours at 90° C. The product solution was evaporated to dryness under vacuum at 50–70° C.

Analysis of the solid product showed that the yield of esterified carbonyl group was 91%, based upon the dimer acid. The cationic ester product was found to be a highly efficient emulsifier for styrene monomer in water.

Example V

A mixture of 295 g. of trimer acid (Empol 1024, Emery Industries, Inc.) which acid contained 1.0 mole of carboxyl group, 211 g. of 70% aqueous glycidyltrimethylammonium chloride (1.0 mole) and 100 ml. of isopropanol was heated at 50° C. for 8 hours and at 90° C. for an additional 12 hours. Analysis of the resulting semi-solid product indicated that 87% of the carboxyl groups had been esterified.

Example VI

The surface tension of various aqueous solutions of the products of Examples I–V was measured against air at 25° C. Under the conditions of the test employed, the surface tension of a water blank was found to be 72 dynes/cm. in agreement with literature values. For purposes of comparison, similar tests were conducted using aqueous solutions of stearyltrimethylammonium chloride, a representative commercial cationic surface-active agent. The results of the evaluations are given in Table I.

TABLE I

| 2-hydroxypropyltrimethyl ammonium chloride ester derived from— | Surface Tension, dynes/cm. | | |
|---|---|---|---|
|  | 0.1% | 0.01% | 0.001% |
| Stearic acid | 42 | 45 | 56 |
| Palmitic acid | 40 | 48 | 67 |
| Tall oil fatty acids | 33 | 46 | 71 |
| Dimer acid | 59 | 62 | 66 |
| Trimer acid | 54 | 58 | 73 |
| $C_{18}H_{37}\overset{+}{N}(CH_3)_3Cl^-$ | 42 | 49 | 70 |

I claim as my invention:
1. The process of producing monomeric cationic esters by reacting (a) aqueous glycidyltrialkylammonium halide wherein each of said alkyls has from 1 to 12 carbon atoms, at least two of the alkyls have from 1 to 4 carbon atoms, said halide is halogen of atomic number from 17 to 35, and the concentration of said glycidyltrialkylammonium halide in said aqueous solution is from about 50% to about 80% by weight, with (b) hydrocarbon mono- to tetracarboxylic fatty acid having from 0 to 4 ethylenic linkages and from 9 to 30 carbon atoms for each carboxyl group and said acid having no more than 70 carbon atoms, the ratio of moles of carboxyl group to the moles of glycidyltrialkylammonium halide being from about 1:4 to about 4:1, in liquid-phase solution at a temperature from about 40° C. to about 140° C.

2. The process of claim 1 wherein the glycidyltrialkylammonium chloride is glycidyltrimethylammonium chloride, said fatty acid is a mono- to tricarboxylic fatty acid having from 0 to 3 ethylenic linkages and from 9 to 20 carbon atoms for each carboxyl group and the ratio of moles of carboxyl group to moles of glycidyltrimethylammonium chloride is from about 1:2 to about 2:1.

3. The process of claim 2 wherein the fatty acid is monocarboxylic.

4. The process of claim 2 wherein the acid is stearic acid.

5. The process of claim 2 wherein the acid is dimer acid.

6. The process of claim 2 wherein the acid is tall oil fatty acid.

References Cited

UNITED STATES PATENTS

| | | | |
|---|---|---|---|
| 2,897,201 | 7/1959 | Albrecht | 260—404.5 X |
| 3,217,018 | 9/1965 | Pollitzer | 260—404.5 |
| 3,272,712 | 9/1966 | Kalopissis et al. | 260—404 X |

OTHER REFERENCES

J. Org. Chem. 28 (2283–2288), (1963) by Burness "Synthesis and Reactions of Quaternary Salts of Glycidyl Amines."

NICHOLAS S. RIZZO, *Primary Examiner.*

ALEX MAZEL, *Examiner.*

F. A. MIKA, *Assistant Examiner.*